US005207410A

United States Patent [19]

Wakeman

[11] Patent Number: 5,207,410

[45] Date of Patent: May 4, 1993

[54] MEANS FOR IMPROVING THE OPENING RESPONSE OF A SOLENOID OPERATED FUEL VALVE

[75] Inventor: Russell J. Wakeman, Newport New, Va.

[73] Assignee: Siemens Automotive L.p., Auburn Hills, Mich.

[21] Appl. No.: 892,847

[22] Filed: Jun. 3, 1992

[51] Int. Cl.[5] .......................... F16K 31/06; H01F 3/00

[52] U.S. Cl. ................................ 251/129.15; 335/281

[58] Field of Search ....................... 251/129.15, 129.16, 251/129.18; 335/279, 281

[56] References Cited

U.S. PATENT DOCUMENTS 2,498,702 2/1950 Nahman .............................. 335/281

4,810,985 3/1989 Mesenich ......................... 335/281 X 5,002,253 3/1991 Kolchinsky et al. ........... 251/129.15

*Primary Examiner*—John Rivell

*Attorney, Agent, or Firm*—George L. Boller; Russel C. Wells

[57] ABSTRACT

Because of inherent delay in magnetic flux propagation in the magnetic circuit, the transient opening magnetic force on the armature does not build as rapidly as the injector driver circuit may be capable of commanding. This transient force is augmented without increasing the package size of the magnetic circuit. A fuel injector has a novel solenoid actuator magnetic circuit that has slots, convolutions, or the like dispersed in the surface of the magnetic circuit to provide increased surface area on the magnetic circuit in the direction of the lines of flux generated when the solenoid is energized along a path to the magnetic gap without increasing the overall size of the magnetic circuit. This increased surface area for the skin provides increased flux paths in the magnetic gap during the transient build-up of magnetic force across the gap, thereby improving the response of the armature upon opening. The slots/convolutions themselves and, especially, a novel arrangement of the slots/-convolutions provide a resistivity increasing means for increasing the resistivity of the magnetic circuit by increasing the path length of the eddy currents that flow normal to the lines of flux in the magnetic circuit.

14 Claims, 2 Drawing Sheets

MEANS FOR IMPROVING THE OPENING RESPONSE OF A SOLENOID OPERATED FUEL VALVE

FIELD OF THE INVENTION

The invention relates generally to solenoid operated fluid valves and is herein specifically disclosed as an improvement in a valve for the high-pressure, direct injection of a volatile fuel such as gasoline into a two-stroke internal combustion engine.

BACKGROUND AND SUMMARY OF THE INVENTION

The ability of a fuel injector to respond to an input signal's command to open is a significant factor in the fuel injector's ability to deliver a precise injection of fuel to a combustion chamber. Parameters that define the fuel injector's magnetic circuit (e.g., the stator, the armature, and the working gap between the stator and the armature) are of particular importance since it is this magnetic circuit that conducts the magnetic flux that exerts the magnetic force which acts on the armature. The rate at which the magnetic flux builds determines the rate at which force acting on the armature builds. The faster the force builds, the faster the fuel injector opens.

While it is recognized that magnetic flux cannot be built instantaneously, it has been conventional practice to use various fuel injector driver circuits that seek to maximize the building of electric current in the solenoid's coil in the expectation that this will necessarily also maximize the rate at which magnetic flux is built in the magnetic circuit, and as a consequence also minimize the fuel injector's opening time.

It has now been discovered that the transient building of magnetic flux does not occur uniformly over the transverse cross sectional area of the magnetically conductive material (i.e. the stator and armature) in the valve's magnetic circuit. Rather, flux must build first in the magnetically conductive material's "skin" before it can build in the interior of the material's cross section. This phenomenon is a physical characteristic of the magnetic circuit material and is in the nature of a time constant (albeit a small one) that delays the propagation of flux into the interior of the cross section. For convenience it will be referred to herein as the flux propagation delay characteristic. Consequently, for a given magnetic circuit structure, the building of flux at any given point within a transverse cross section of the structure in response to the building of current in the coil, is a transient phenomenon that is a function of the input current to the coil as a function of time and the particular location of that point within the cross section. The flux propagation delay characteristic is an inherent constraint on the ability of a magnetic circuit to build flux, irrespective of the ability of a driver circuit to build electric current in the solenoid's coil, so that minimizing the coil current build time is not necessarily conclusive of maximizing the building of magnetic flux during such a transient. Magnetic saturation too is an inherent physical characteristic of the magnetic material in the magnetic circuit that comes into play.

Stating the foregoing in a different way, it may be said that certain rates of current build during the transient building of magnetic force which, in the absence of the flux propagation delay characteristic, would be effective to build a uniform flux density over the transverse cross sectional area of the magnetically conductive material within a certain time, will instead within a like period of time when the flux propagation delay characteristic is taken into account, result in a magnetic flux pattern over a given transverse cross sectional area of the magnetically conductive material that is non-uniform; and if the coil is driven sufficiently hard during the transient, the pattern will, on account of magnetic saturation, consist of a magnetically saturated skin and a flux-poor interior wherein the total magnetic flux that is less than that which would be created in the absence of the flux propagation delay characteristic.

Force that builds as a transient during the time that the coil current is building and domains of the magnetically conductive material are becoming magnetized is a significant contribution toward opening the fuel injector. While a final steady state force (short of saturation) is a function of the cross-sectional area of the magnetically conductive material, the transient force has been found to be a function of the length of the magnetically conductive material's skin, as measured around the perimeter of its transverse cross-sectional area. While there is no precise definition for the skin, it is typically quite thin, for example only a few microns. Since the transverse cross sectional area of this "skin" is small, it is apt to saturate before the flux can propagate more interiorly of the cross section. Thus, full advantage of the total cross-sectional area of the magnetically conductive material cannot be taken during this transient condition, and hence the building of the transient force is constrained.

Where a fuel injector must comply with a specified opening force requirement, and certain dimensional constraints are also imposed on the size of the fuel injector, it may not always be possible to realize a solution with known technology. Accordingly, it is desirable to improve the probability of obtaining a solution, and it is toward this objective that the present invention is directed. Principles of the present invention endow a fuel injector with the ability to comply with a specified opening force requirement within an equal or smaller package size than heretofore possible with a solenoid-operated device. Moreover, principles can be incorporated through the use of conventional manufacturing procedures.

Another effect that is detrimental to the building of magnetic force is the phenomenon of eddy currents. Changing current in the solenoid's coil creates such currents in the magnetically conductive material and slows the opening of the fuel injector. Accordingly, it also would be beneficial if the solution that is afforded by the present invention were to also attenuate such eddy currents, and that can in fact be accomplished in the implementation of the invention.

Briefly, a presently preferred embodiment of the present invention is disclosed herein as a fuel injector valve having a novel magnetic circuit.

The magnetic circuit comprises a stator, an armature, and a working gap. Generally speaking, the invention comprises means for increasing the amount of magnetic material "skin" without a corresponding increase in package size. The increase in the amount of such skin is accomplished by inclusion of sets of slots in the magnetic material. The magnetic material also includes means for altering the circulation path for the eddy currents in a manner that is intended to attenuate their interference with building transient magnetic force.

In the disclosed preferred embodiment, the invention includes a stator having inner and outer cylindrical pole members extending from a circular annular end wall and forming a tubular space into which is disposed an electrically actuated solenoid coil for generating a magnetic field operative to displace the armature and open the fuel injector. The magnetic circuit of the preferred embodiment thus includes two parallel annular working gaps disposed between the armature and the free ends of the inner and outer pole members. Means for increasing the amount of stator skin without increasing its package size comprises slots running along the pole members, although broad principles of the invention contemplate that slots may be disposed along any portion of the magnetic circuit that conducts the flux that passes across the magnetic gap.

Other objects, advantages, and capabilities of the present invention will become more apparent as the description proceeds.

BRIEF DESCRIPTION OF THE DRAWINGS

The invention may be better understood and further advantages and uses thereof more readily apparent, when considered in view of the following detailed description of exemplary embodiments, taken with the accompanying drawings, in which.

DESCRIPTION OF THE PREFERRED EMBODIMENTS

Figure 1:
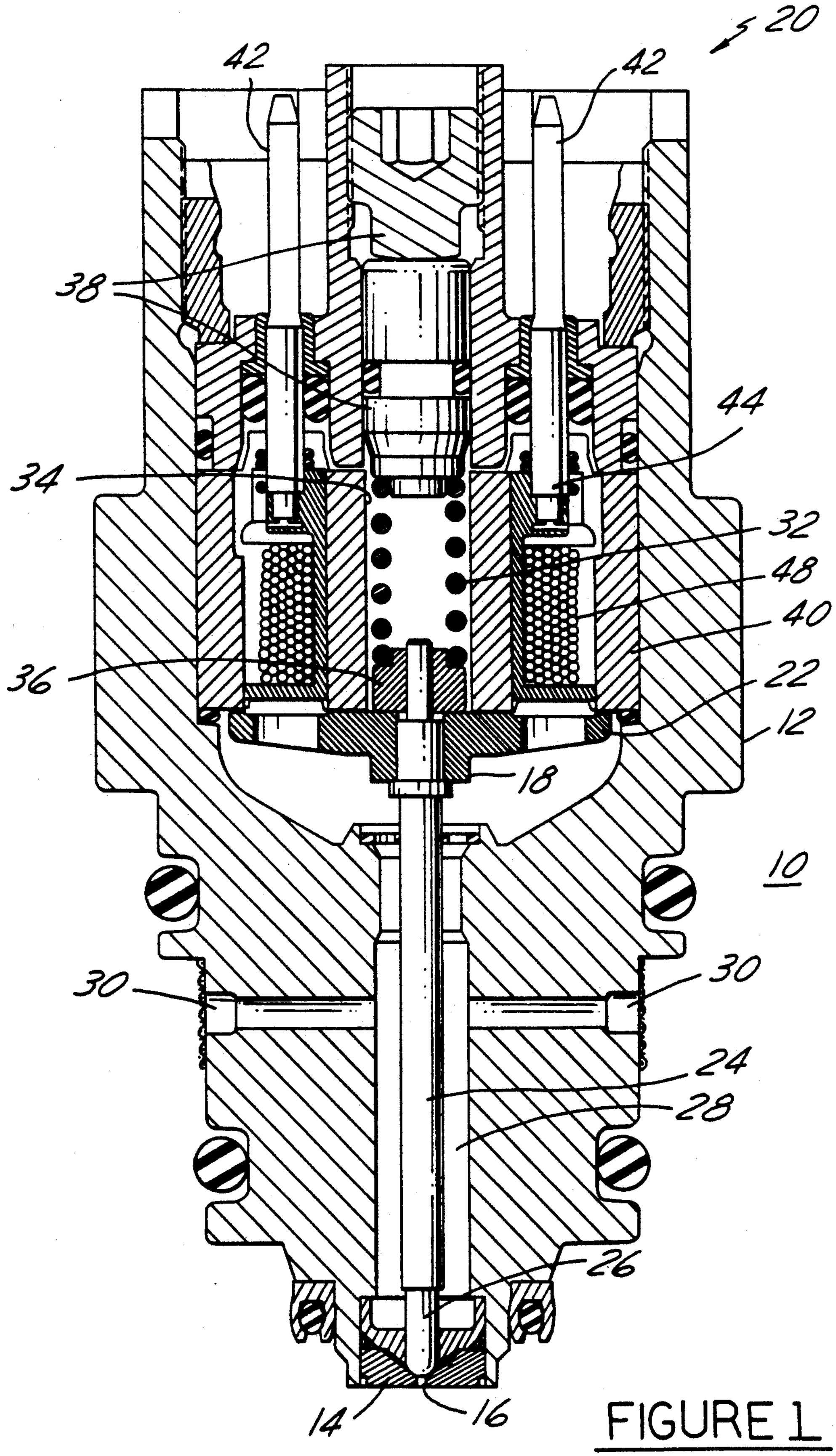
FIG. 1 is a cross-sectional view of a fuel injector valve constructed according to the teachings of the invention.

Referring now to the drawings and to FIG. 1 in particular, there is shown a cross-sectional side view of fuel injector valve 10 constructed according to the teachings of the invention. Valve 10 includes cylindrical housing 12 containing valve seat 14 circumscribing outlet port 16, armature assembly 18 and electrically actuated solenoid 20. Armature assembly 18 includes armature disk 22, valve stem 24 and valve needle 26. Valve needle 26 fits contiguous with valve seat 14 and is biased to block outlet port 16 by return spring 32 which is disposed in return spring bore 34 between spacer block 36 and tension adjustment mechanism 38. Solenoid 20 includes stator 40, electrical terminals 42 adapted for connection to an outside power source (not shown), which pass through a pair of mating apertures 44 disposed through stator end wall 56 and coil 48, which, when electrical terminals 42 are connected to the outside power source, generates a magnetic field operative to overcome the bias of return spring 32 and displace armature assembly 18 upward from valve seat 14, thereby allowing passage of fuel through fluid flow passages 28 and outlet port 16. Other portions of the fuel injection system (not shown) provide a regulated fuel supply to fluid inlet ports 30 which are adapted for sealed connection to the fuel injection system.

When an energizing signal, such as a rectangular voltage pulse is applied to solenoid 20, the electric current executes a transient build-up. This will give rise to a transient build-up of magnetic force. This may saturate the stator skin before the flux can propagate inwardly due to the flux propagation delay characteristic mentioned above and eddy currents which resist the force build-up magnetization will be generated. Conversely, when solenoid 20 is de-energized, the decreasing coil current transient generates eddy currents in the magnetic circuit which resist demagnetization of the magnetic circuit, and this may affect injector closing.

Figure 2:
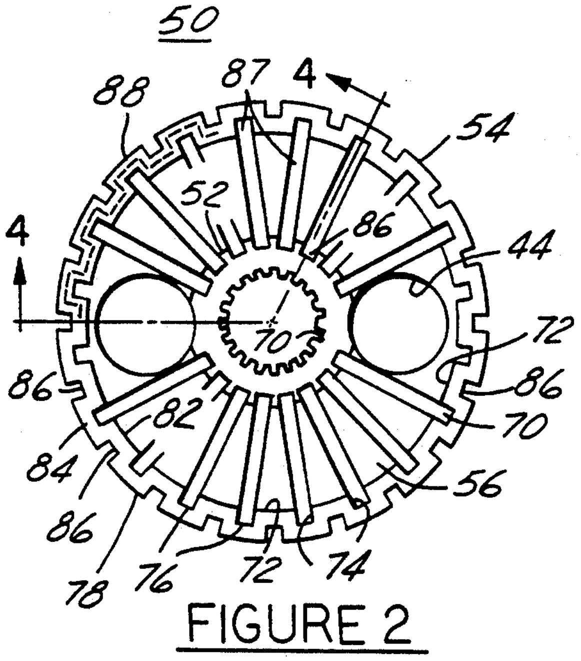
FIG. 2 is a bottom view of the solenoid stator of FIG. 1 showing longitudinal grooves on the ID and OD of the outer cylindrical pole member.
Figure 3:
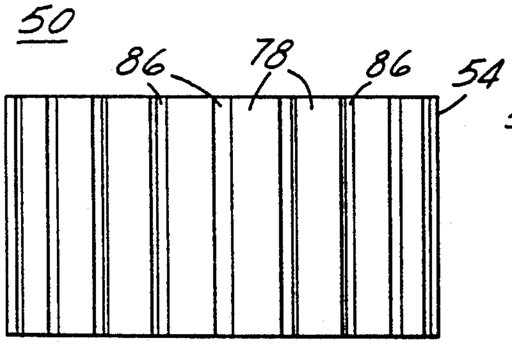
FIG. 3 is a front elevational view of the solenoid stator of FIG. 2 showing the outer grooves disposed in the OD of the outer cylindrical pole member.
Figure 4:
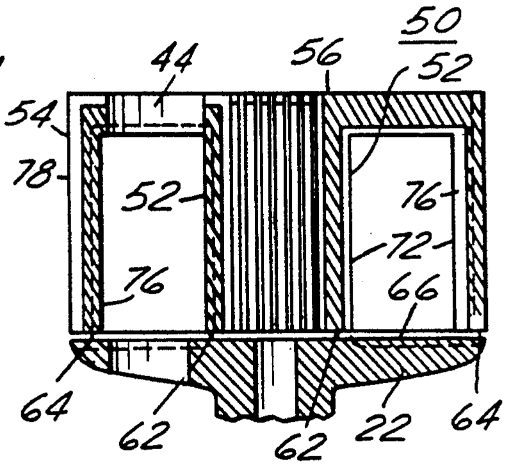
FIG. 4 is a cross-sectional view of the solenoid and armature disk of the invention taken in the direction of sectional arrows 4—4 of FIG. 2.

A magnetic circuit having means to increase the amount of stator "skin" in the magnetic circuit without increasing the stator's physical size is an object of the present invention and is shown in FIGS. 2, 3 and 4. Constructed according to the principles of the invention magnetic circuit 50 includes armature disk 22, stator 40 having inner cylindrical pole 52 and outer cylindrical pole 54 disposed on end wall 56, and inner and outer magnetic working gaps 62 and 64, respectively. When solenoid 20 is energized, magnetic flux lines drawn in phantom at 66 are generated at the surface skin of magnetic circuit 50 (the domains of magnetic circuit 50 are magnetized from the outside surface in toward the interior).

Both inner cylindrical pole 52 and outer cylindrical pole 54 have fixed diameters and in order to increase the amount of stator skin of magnetic circuit 50 without increasing the stator's overall physical size, outer cylindrical pole 54 has slots 70 disposed in its ID surface/-wall 72, thereby increasing the surface area of outer pole 54's ID surface/wall 72 by slot sidewalls 74. Consequently, flux lines 66 now have a much larger amount of skin through which to pass during the transient and thus provide effectively larger amounts of lines of flux 66 in outer magnetic gap 64 where these increased lines of flux are converted into increased magnetic force on armature disk 22 during the time a transient current is increasing in solenoid coil 48. The OD wall 78 of outer pole 54 is press fit or otherwise disposed snugly into housing 12 of injector valve 10. Only ID surface/wall 72, slot sidewalls 74 and slot bottoms 76 are exposed to outer magnetic gap 64 where the increased amount of skin and consequent flux line capacity can be converted into magnetic force across outer gap 64.

The OD surface/wall 78 of outer pole 54 may be slotted to increase the resistivity of magnetic circuit 50 because the slots also have some effect on eddy currents in the magnetic circuit 50. Referring again now to FIG. 2, with no material between the ribs 82 that remain after the slots 70 have been cut, eddy currents are limited to within the material of the rib 82, and flowing in the web 84 that is left at the bottom of the slots. The path in the web can be further restricted if outer diameter slots 86 are cut at a radial spacing that intersperses them between the inner diameter slots 70. This pattern of alternating inner and outer slots 70, 86 respectively makes the path for the eddy currents (shown in phantom at 88) more tortuous than in an unslotted stator.

Slots 70 are disposed on the interior wall (ID) of outer pole 54, but they could be disposed on the surface of either inner pole 52, outer pole 54, armature 22, or endwall 56, i.e., anywhere on a surface of magnetic circuit 50 that is exposed to the magnetic field generated when coil 48 is energized and where the generated flux lines pass through the magnetic gap(s) such as inner and outer gaps 62 and 64, respectively, such as, for instance, where the flux lines 66 are drawn in phantom in FIG. 4. FIGS. 2 and 4 show axial slots 86 and 70 on the O.D. and I.D. respectively of inner pole 52, and radial slots 87 on the inside of end wall 56.

Figure 5:
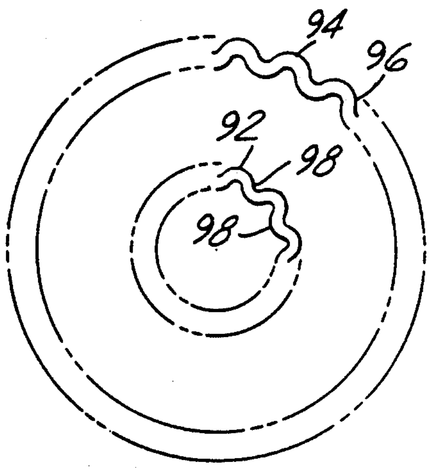
FIG. 5 is a bottom view of a solenoid stator of another embodiment of the invention.
Figure 6:
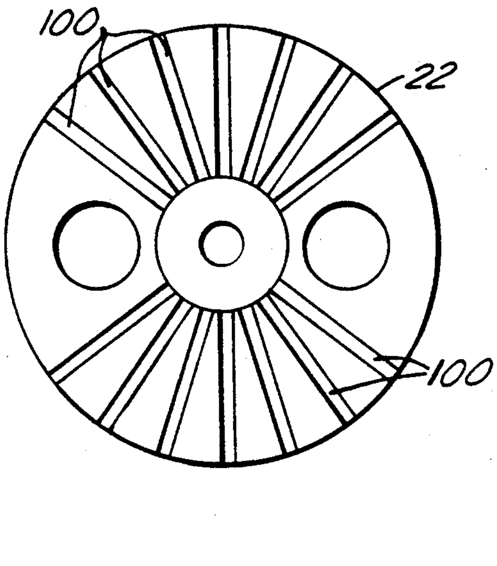
FIG. 6 is a top view of an armature disk.

Referring now to FIG. 5 there is shown a bottom view of a solenoid stator of another embodiment of the invention wherein now both the inner and outer poles 92 and 94 respectively have convoluted or corrugated surfaces 96 and 98 respectively so as to provide increased skin area without increasing the package size of the stator. Surfaces 96, 98 are another means for increasing the skin area just as slots 70 did in FIGS. 3,4 and 5. Please note that as discussed above both outer and inner surfaces 96, 98 of both inner and outer poles 92, 94, respectfully, are convoluted because the increased surface area of the magnetic circuit is useful whenever the enhanced flux lines pass through one or more magnetic gaps. Please also note that when increasing skin area as shown by the use of slots 70, 86 in FIG. 3 or by walls 96, 98 in FIG. 5, that the increase in surface area causes a reduction in the cross-sectional area of the poles for the steady state magnetic circuit. Since the inclusion of slots for increasing the amount of skin reduces the cross-sectional area for steady-state flux, the size and number of slots should be minimized to that necessary to create the desired transient magnetic force across the magnetic gap(s) of the magnetic circuit. In many instances however, cross-sectional areas of the magnetic circuit are typically large enough that the steady state flux does not approach saturation even with the reduced cross-sectional area due to the increased skin area. FIG. 6 shows armature disk 22 containing radial slots 100 in its upper face, similar to radial slots 87 in the stator end wall.

In conclusion what has been disclosed is a novel fuel injection valve having a magnetic circuit that develops high-transient force quickly, dissipates less energy than its solid counterpart, is mechanically equivalent in the solenoid assembly, and is no more costly to manufacture because the slots can be incorporated by ribbed or convoluted surfaces made in a powdered metal or metal injection molding process.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. A valve, comprising:

(a) a housing comprising an inlet port;

(b) a valve seat disposed circumscribing an outlet port in said housing;

(c) an armature comprising a valve element and biased to close said element on said valve seat;

(d) a stator having at least a first pole member disposed in spaced relationship with said armature to define at least a first magnetic gap, said stator, armature and first magnetic gap comprising at least a first portion of a magnetic circuit;

(e) an electrically actuated solenoid coil circumscribing said first pole member, said solenoid coil when energized generating magnetic field flux lines at first on the skin of and thereafter throughout said magnetic circuit operative to displace said armature across said magnetic gap towards said first pole member and thereby displacing said valve element from said valve seat; and (f) means disposed on said first portion of the magnetic circuit for increasing the skin area of the first portion of the magnetic circuit comprising a first set of slots extending in the direction of the lines of flux generated when the solenoid coil is energized along a path to the magnetic gap whereby greater transient magnetic force is created during the transient time the current in building in the solenoid coil.

2. The valve of claim 1 wherein the first portion of the magnetic circuit has first and second opposing sides and said first set of slots are disposed on the first side of the first portion of the magnetic circuit and further including a second set of slots disposed on the opposing second side interspersed with the first set of slots in the direction of lines of flux that are not on a path to the magnetic gap.

3. The valve of claim 1 wherein said slots are defined by a convoluted surface disposed on one side of the first portion of the magnetic circuit in the direction of the lines of flux along a path to the magnetic gap.

4. The valve of claim 3 including a second convoluted surface disposed on the opposite side of and interspersed with the first convoluted surface on the first portion of the magnetic circuit in the direction of the lines of flux that are not on a path to the magnetic gap.

5. The valve of claim 1 wherein the stator includes outer and inner cylindrical poles disposed on a radial end wall in spaced relationship with the armature to define inner and outer magnetic gaps and wherein said slots are disposed at predetermined locations on the inner surface of said outer cylindrical pole members in the longitudinal direction along a path to the outer magnetic gap.

6. The valve of claim 5 wherein the outer and inner cylindrical poles are disposed on the radial end wall at a predetermined radial spacing to allow the electrically actuated solenoid coil to be disposed between the outer and inner cylindrical poles and circumscribing the inner cylindrical pole.

7. The valve of claim 6 including a second set of slots disposed at predetermined locations on the outer surface of the inner cylindrical pole in the longitudinal direction along a path to the inner magnetic gap.

8. The valve of claim 7 further including third and fourth sets of slots disposed at predetermined locations on the radial end wall and the armature, respectively, in a radial direction along paths between and in line with the first and second sets of slots on the outer and inner cylindrical poles respectively, to provide continuous slots along a path through the outer and inner magnetic gaps.

9. The valve of claim 8 including a fifth set of slots disposed at predetermined locations on the outer surface of said outer cylindrical pole interspersed with the first set of slots on the inner surface of said outer cylindrical pole respectively, to provide a more tortuous path for eddy currents that flow normal to the lines of flux generated in the magnetic circuit when the solenoid coil is energized.

10. The valve of claim 9 wherein the first set of slots are as deep as the width of the outer magnetic gap so that all increased lines of flux are directed across the outer magnetic gap where they are converted into magnetic force.

11. The valve of claim 10 including a sixth set of slots disposed on the inner surface of the inner cylindrical pole interspersed with the second set of slots on the outer surface of the inner cylindrical pole, respectively, to provide a more tortuous path for eddy currents that flow normal to the lines of flux generated in the magnetic circuit when the solenoid coil is engaged.

12. A valve comprising an inlet port, an outlet port, a flow path between said ports, a valve means controlling flow between said ports, a solenoid for operating said valve means, said solenoid comprising a magnetic circuit composed of magnetically conductive material forming a stator that has an associated electric coil and an armature, that is operatively coupled to said valve means for operating said valve means in accordance with the energization and de-energization of said coil, characterized in that said magnetically conductive material comprises a series of slots extending lengthwise of the direction of the magnetic lines of flux that are generated in the magnetic circuit where the coil is energized, said slots being disposed in an exterior surface of the magnetically conductive material and extending lengthwise from a working gap separating said stator from said armature.

13. A valve as set forth in claim 12 wherein said slots are straight and arranged in a uniform pattern circumferentially about a longitudinal axis of the valve.

14. A valve as set forth in claim 13 wherein said slots are in said stator.

* * * * *